United States Patent
Nakagawa (10) Patent No.: US 7,590,686 B2
(45) Date of Patent: Sep. 15, 2009

(54) APPARATUS FOR CONTROLLING A MULTI-PROCESSOR SYSTEM, SCALABLE NODE, SCALABLE MULTI-PROCESSOR SYSTEM, AND METHOD OF CONTROLLING A MULTI-PROCESSOR SYSTEM

(75) Inventor: Satoshi Nakagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 759 days.

(21) Appl. No.: 11/045,077

(22) Filed: Jan. 31, 2005

(65) Prior Publication Data
US 2006/0090041 A1    Apr. 27, 2006

(30) Foreign Application Priority Data
Oct. 25, 2004 (JP) ............... 2004-309116

(51) Int. Cl.
*G06F 15/16*    (2006.01)
(52) U.S. Cl. ..................... 709/203; 709/232
(58) Field of Classification Search ............ None
See application file for complete search history.

(56) References Cited

U.S. PATENT DOCUMENTS 6,584,101 B2 *  6/2003  Hagglund et al. ......... 370/389

2003/0005236 A1    1/2003  Arimilli et al.
2005/0262309 A1 *  11/2005  Frey et al. ............ 711/141

FOREIGN PATENT DOCUMENTS

JP    07-028748    1/1995

OTHER PUBLICATIONS

"European Search Report", mailed Mar. 18, 2009 in corresponding EP patent application no. 05250463.

* cited by examiner

*Primary Examiner*—Patrice Winder
*Assistant Examiner*—Minh-Chau Nguyen
(74) *Attorney, Agent, or Firm*—Fujitsu Patent Center (57) ABSTRACT

An apparatus for controlling a multi-processor system comprises: a plurality of local ports that holds a data request made from the node; a local snoop unit that performs a local snoop on the requests held in the local ports; a broadcast queue that broadcasts the request to the other nodes when the local snoop fails to process requested data; a plurality of global ports that hold requests broadcast from the other nodes; a global snoop unit that performs a global snoop on the requests held in the global ports; and a plurality of retry-mode control units 13 that switches global retry mode to local retry mode, or vice versa, in accordance with a prescribed condition, so that a retry instruction is issued when the global snoop fails to process the requested data.

18 Claims, 7 Drawing Sheets

APPARATUS FOR CONTROLLING A MULTI-PROCESSOR SYSTEM, SCALABLE NODE, SCALABLE MULTI-PROCESSOR SYSTEM, AND METHOD OF CONTROLLING A MULTI-PROCESSOR SYSTEM

BACKGROUND OF THE INVENTION

1. Field of the Invention

The present invention relates to an apparatus for controlling a multi-processor system, designed to improve the performance of the snoop process carried out by the multi-processor system. The invention relates also to a scalable node, a scalable multi-processor system, and a method of controlling a multi-processor system.

2. Description of the Related Art

Figure 9:
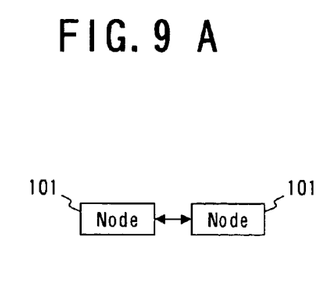
FIGS. 9A and 9B are block diagrams showing an example of the configuration of a conventional scalable multi-processor system.

FIGS. 9A and 9B are block diagrams showing an example of the configuration of a conventional scalable multi-processor system. The conventional scalable multi-processor system has a plurality of nodes 101. The nodes 101 are scalable nodes that can be connected directly or indirectly to one another. The nodes 101 may be directly connected as shown in FIG. 9A. Alternatively, the nodes 101 may be indirectly connected as shown in FIG. 9B, by cross bars (XBs) 2.

Figure 10:
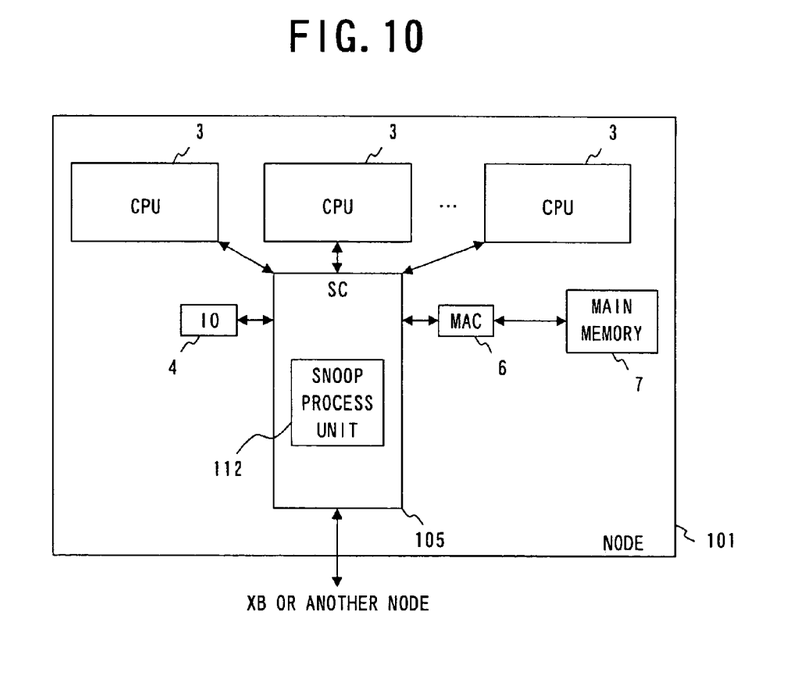
FIG. 10 is a block diagram depicting an example of the configuration of a conventional node.

FIG. 10 is a block diagram depicting an example of the conventional node configuration. In the conventional scalable multi-processor system, each node 101 comprises central processing units (CPUs) 3, an input/output (I/O) unit 4, a system controller (SC) 105, a memory access controller (MAC) 6, and a main memory 7. In the node 101, known as "local node," the SC 105 is connected to the CPUs 3, the IO 4 and the MAC 6, and also to the SCs of the other nodes or the XBs 2. The SC 105 has a snoop process unit 112 that performs a snoop process. The MAC 6 is connected to the main memory 7.

The nodes 101 share one memory by means of cache coherent non-uniform memory access (CC-NUMA). How the CC-NUMA operates will be briefly described. When any CPU 3 or the IO 4 issues a request for data, the snoop process unit 112 performs a snoop process to determine whether the data desired is stored in the caches of the other CPUs 3 or in the main memory 7. This process is called "local snoop".

If it is determined, in the local snoop, that the data desired is not in the local node, or if the data is not supplied due to busy state, the snoop process unit 112 broadcasts the request to all nodes 101. The snoop process is therefore performed on all nodes at the same time. This process is called "global snoop".

Prior art related to the present invention is disclosed in, for example, Jpn. Pat. Appln. Laid-Open Publication No. 7-28748 (see pages 3 and 4, and FIG. 1).

In the above-mentioned global snoop, the address field that the request should access may be busy because a preceding request has already accessed it. In this case, the global snoop is repeatedly retried until the preceding request ceases to access the address field. Thus, the global snoop takes a long time when requests concentrate on a particular address field.

The queue waiting for the global snoop is limited. If the queue has reached its limit, the following requests cannot be broadcast. Thus, once the queue for the global snoop has reached its limit, any request is kept waiting even if the address field to be accessed is not busy. In other words, the process on an address field on which accesses do not concentrate is delayed due to the process on any other address field on which accesses concentrate.

SUMMARY OF THE INVENTION

The present invention has been made in view of the above problems. An object of the invention is to provide an apparatus for controlling a multi-processor system, a scalable node, a scalable multi-processor system and a method of controlling a multi-processor system, all configured to improve the performance of snoop retries.

In order to achieve the above-mentioned object, this invention provides an apparatus for controlling a multi-processor system, which is designed for use in a scalable multi-processor system having a plurality of nodes and which is provided in each node to perform a process on a data request. The apparatus comprises: a plurality of local ports that holds a data request made from the node; a local snoop unit that performs a local snoop on the requests held in the local ports; a broadcast queue that holds the request subjected to the local snoop and broadcasts the request to the other nodes when the local snoop fails to process requested data; a plurality of global ports that hold requests broadcast from the other nodes; a global snoop unit that performs a global snoop on the requests held in the global ports; and a plurality of retry-mode control units that have two retry modes, i.e,. global retry mode and local retry mode, and switch one retry mode to the other in accordance with a prescribed condition, so that a retry instruction is issued to the global ports in the global retry mode or to the local ports in the local retry mode when the global snoop fails to process the requested data.

The apparatus for controlling a multi-processor system, according to this invention, is characterized in that the local ports keep holding the data request issued from the node, until the local snoop solves the request data or until the global snoop solves the requested data.

This invention also provides a scalable node that comprises: an apparatus for controlling a multi-processor system, according to the invention; a plurality of CPUs that issues data requests to the apparatus for controlling a multi-processor system; and a main memory that holds data, which is read in accordance with a request issued from the apparatus for controlling a multi-processor system.

This invention provides a scalable multi-processor system that has a plurality of scalable nodes according to the present invention.

This invention provides a method of controlling a multi-processor system, which is a scalable multi-processor system having a plurality of nodes and which performs a process on a data request in each node. The method comprises: a plurality of local port steps of holding a data request made from the node; a local snoop step of performing a local snoop on the requests held in the local port step; a broadcast step of holding the request subjected to the local snoop and broadcasting the request to the other nodes when the local snoop fails to process requested data; a plurality of global port steps of holding requests broadcast from the other nodes; a global snoop step of performing a global snoop on the requests held in the global port steps; and a plurality of retry-mode control steps of switching one retry mode to the other retry mode in accordance with a prescribed condition, the retry modes being global retry mode and local retry mode, so that a retry instruction is issued for the global port steps in the global retry mode or for the local port step in the local retry mode when the global snoop fails to process the requested data.

The local snoop unit is a local snoop pipeline 30 in an embodiment of the invention. The global snoop unit is a global snoop pipeline 60 in the embodiment.

In the present invention, queues waiting for a global snoop are skipped so that the global snoop requested next may be possible. This prevents the following request from being delayed. As a result, the efficiency of accessing the memory can be enhanced.

DETAILED DESCRIPTION OF THE PREFERRED EMBODIMENTS

An embodiment of the present invention will be described, with reference to the accompanying drawings.

Figure 1:
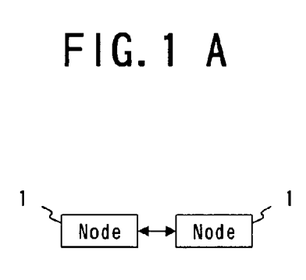
FIGS. 1A and 1B are block diagrams showing examples of the configuration of a scalable multi-processor system according to this invention.

FIGS. 1A and 1B are block diagrams showing examples of the configuration of a scalable multi-processor system according to this invention. Like FIG. 9A, FIG. 1A shows a system in which scalable nodes 1 are directly connected. Like FIG. 9B, FIG. 1B shows a system in which scalable nodes 1 are indirectly connected. In the scalable multi-processor system according to this invention, the nodes 1 are used in place of the nodes 101 that are shown in FIGS. 9A and 9B.

Figure 2:
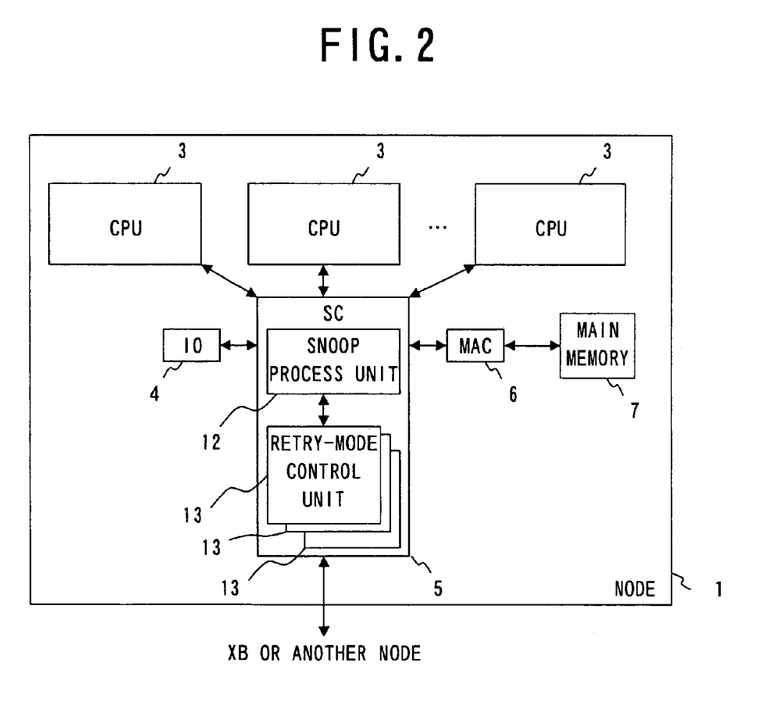
FIG. 2 is a block diagram depicting an example of the configuration of a node according to this invention.

FIG. 2 is a block diagram depicting an example of the configuration of one of the nodes 1 according to this invention. The node 1 has an SC 5 in place of the SC 105 shown in FIG. 10. The SC 5 according to the invention has a snoop process unit 12 in place of the snoop process unit 112 shown in FIG. 10. The SC 5 according to the invention further has a plurality of retry-mode control units 13. The retry-mode control units 13 are provided in the same number as the nodes n incorporated in the scalable multi-processor system.

Figure 3:
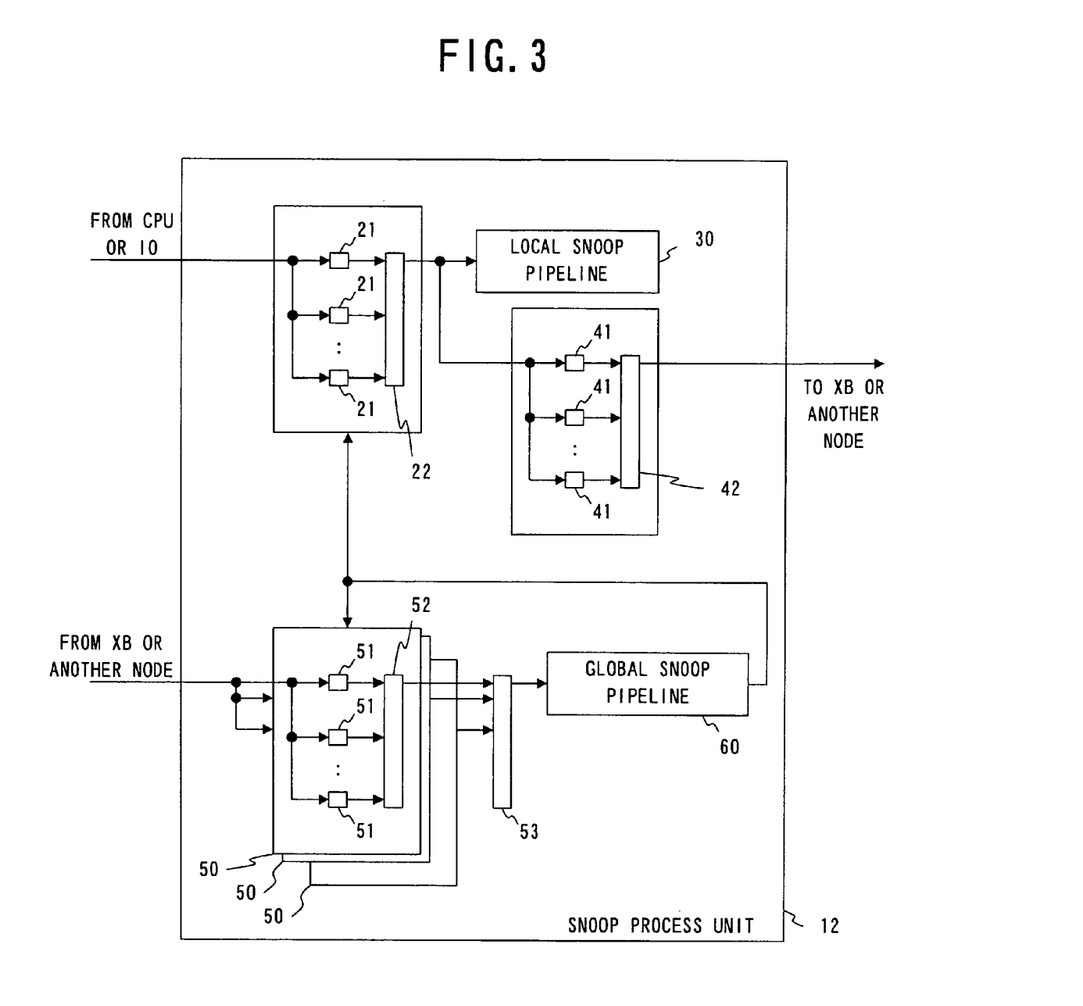
FIG. 3 is a block diagram showing an example of the configuration of a snoop process unit according to the invention.

FIG. 3 is a block diagram that depicts an example of the configuration of the snoop process unit 12 according to the present invention. The snoop process unit 12 is composed of a plurality of local ports 21, a priority-determining unit 22, a local-snoop pipeline 30, a plurality of broadcast queues 41, a priority-determining unit 42, a plurality of global-port groups 50, a priority-determining unit 53, and a global snoop pipeline 60. The number of the global-port groups 50 corresponds to the number of the nodes. Hence, the number of the groups 50 is n, which is the number of the nodes 1. Each global-port group 50 is composed of a plurality of global ports 51 and a priority-determining unit 52. The number of global ports 51, which are provided in each node 50, is g. Therefore, the number of global ports 51 provided in the snoop process unit 12 is g×n.

Figure 4:
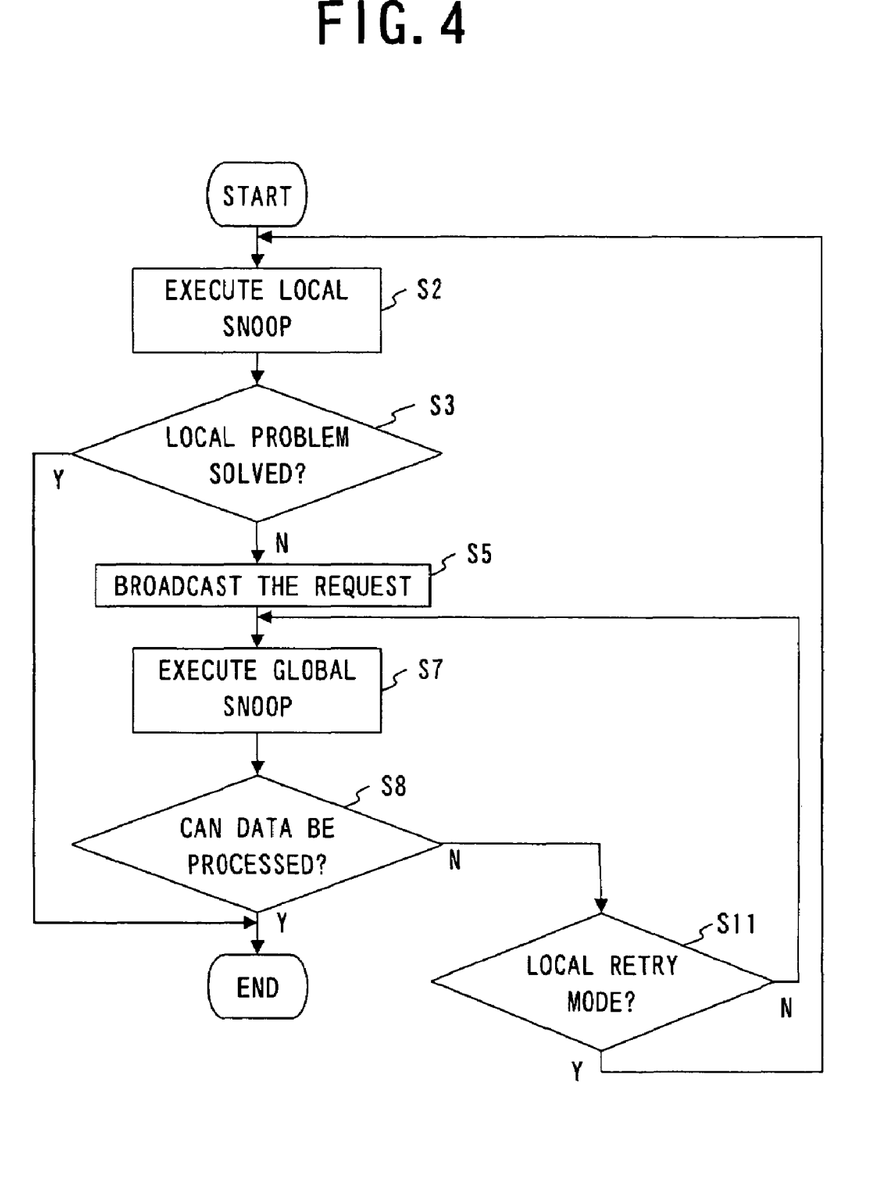
FIG. 4 is a flowchart illustrating an example of the operation of the snoop process unit according to the present invention.

How the snoop process unit 12 operates will be explained. FIG. 4 is a flowchart illustrating an example of the operation of the snoop process unit according to the invention. Here, the operation of the snoop process unit 12, which issues a request for data, will be explained. The retry-mode control unit 13 transfers a retry-mode instruction to the snoop process unit 12. There are two retry modes, i.e., global retry mode and local retry mode. The initial state is the global retry mode. The snoop process unit 12 transfers a state variable to the retry-mode control units 13.

The request for data, issued from the CPU 3 to the SC 5, is set in the queue called "local port 21" that is a queue waiting for a local snoop. The priority-determining unit 22 determines priority for the request set in the local port 21. The unit 22 then supplies the request that has acquired the priority, to the local-snoop pipeline 30, i.e., a pipeline that executes the local snoop (Step S2).

Next, it is determined whether the local snoop has solved the local problem (Step S3). If the local snoop has solved the local problem (if YES in Step S3), the flow is terminated. If the local snoop has not solved the local problem (if NO in Step S3), the request is set in the broadcast queue 41 that holds a request for the broadcast queue. Here, each local port 21 keeps holding the request. After the global snoop process produces results, the global snoop pipeline 60 outputs a reset instruction. Then, the local ports 21 are released. Since each local port 21 holds the request for a long time, it may be filled, failing to transmit the next request coming from the CPU 3 or the IO 4. To avoid this, the local ports are provided in the same number as the requests that the CPU 3 and IO 4 can issue.

Any request that cannot make the local snoop process produce results is broadcast to the SC 5 of any node 1 after the priority-determining unit 42 has acquired priority for the broadcast queues 41 (Step S5). When the request is broadcast, the broadcast queues 41 are released.

The request received from any other SC is set in the global port 51 that should hold the request waiting for the execution of the global snoop. The priority-determining unit 52 gives priority to the outputs of all global ports 51 included in one global port group 50. The priority-determining unit 53 gives priority to the outputs of all global port groups 50. Then, the priority-determining unit 53 supplies the request that has acquired priority, to the global snoop pipeline 60, i.e., the pipeline that is to execute the global snoop. The pipeline 60 executes the global snoop (Step S7). The global snoop is executed in all SCs at the same time. By executing the global snoop, whether the data requested for can be processed or not (Step S8).

If the data requested can be processed (if YES in Step S8), the global port 51 is released in accordance with the reset instruction supplied from the global pipeline 60. The flow is thereby terminated. At this time, the identical request held in the local port 21 is released, too, in accordance with the reset instruction supplied from the global pipeline 60.

If the data requested cannot be processed (if NO in Step S8) because the address field is busy with a preceding request, it is determined whether the retry mode is the local retry mode or not (Step S11).

If the retry mode is not the local retry mode but the global retry mode (if NO in Step S11), the flow returns to Step S7. The global port 51 retries the priority for the global snoop, and the request is supplied again to the global snoop pipeline 60.

If the retry mode is the local retry mode (if YES in Step S11), the global snoop pipeline 60 issues a retry instruction. Then, the global port 51 makes no retries, releasing the global port 51 that corresponds to the retry instruction.

In the SC of the node that has issued the request and received the retry instruction, the flow returns to Step S2 and the request held in the local port 21 is retried.

Since the global port corresponding to the retry instruction has been released, the following request in the broadcast queue, which has been waiting for the release of the global port, is broadcast and set in the global port. The global snoop is thereby executed.

Figure 5:
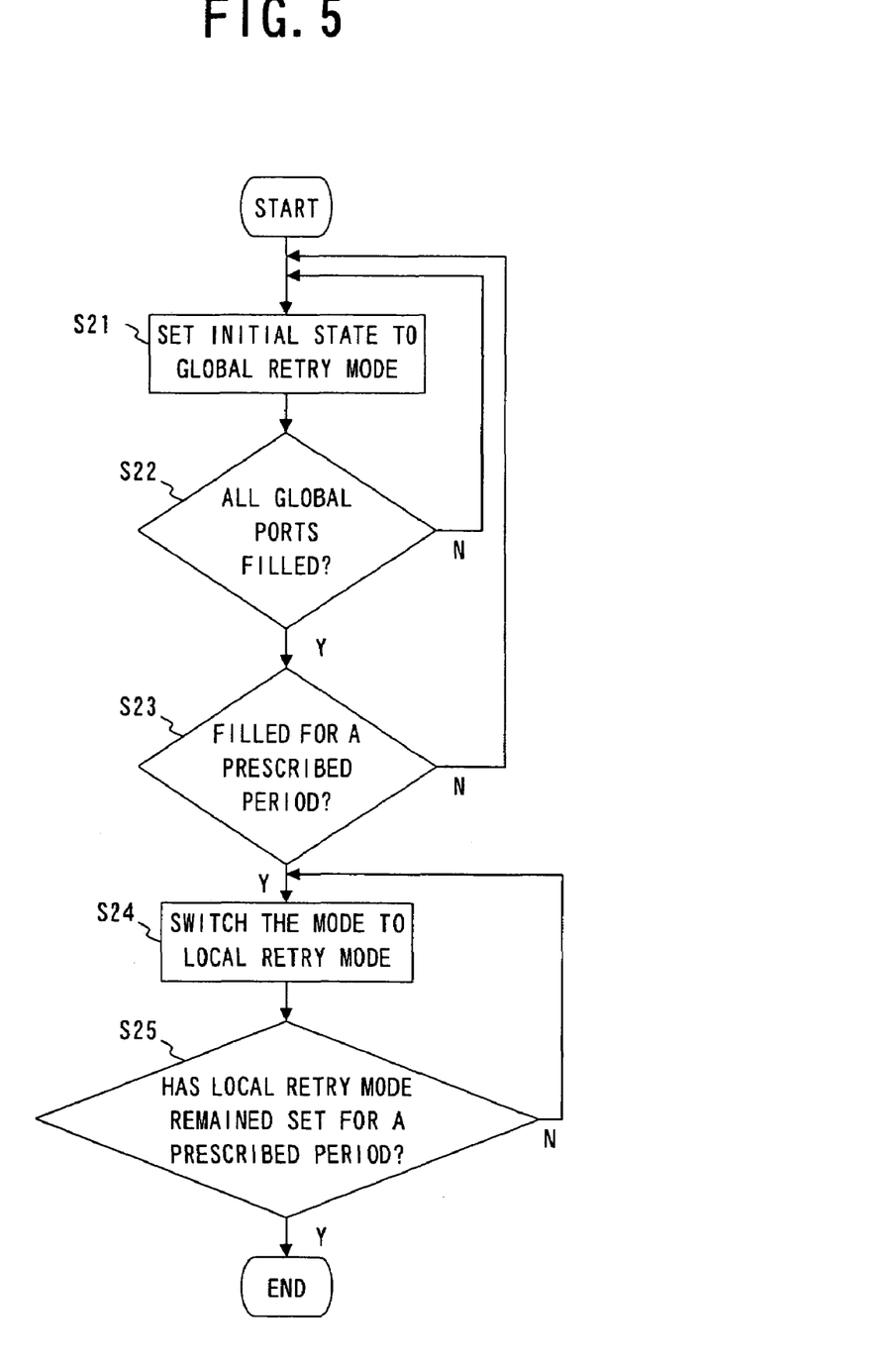
FIG. 5 is a flowchart illustrating an example of the operation of a retry-mode control unit according to this invention.

FIG. 5 is a flowchart illustrating an example of the operation of the retry-mode control unit according to this invention. As described above, the initial state is set to the global retry mode (Step S21).

Next, it is determined whether all global ports 51 of the global port group 50 that corresponds to one node have been filled or not (Step S22). If the global ports 51 have not been filled (if NO in Step S22), the flow returns to Step S21. If the global ports 51 have been filled (if YES in Step S22), it is determined whether the requests filled in all global ports have been repeatedly retried for a prescribed period (Step S23). If it is determined that the requests have not been repeatedly retried for the predetermined period (if NO in Step S23), the flow returns to Step S21. If it is determined that the requests have been repeatedly retried for the prescribed period (if YES in Step S23), the global retry mode is switched to the local retry mode (Step S24). Then, it is determined whether the local retry mode has been set for a prescribed period (Step S25). If the local retry mode has not been set for the prescribed period (if NO in Step S25), the flow returns to Step S24. If the local retry mode has been set for the prescribed period (if YES in Step S25), this flow is terminated and then executed again. In other words, the mode is switched to the global retry mode.

Figure 6:
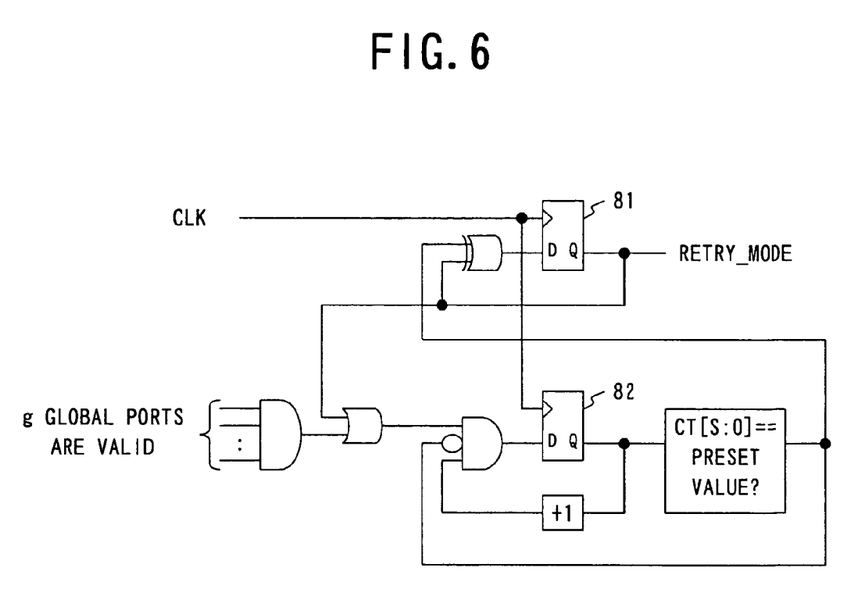
FIG. 6 is a circuit diagram depicting an example of the configuration of the retry-mode control unit according to the present invention.

The configuration of the retry-mode control unit described above will be described in detail. FIG. 6 is a circuit diagram depicting an example of the configuration of the retry-mode control unit according to the present invention. This circuit has a 1-bit flip-flop 81 and a flip-flop 82. The flip-flop 81 holds one bit that indicates the state of the retry mode (RETRY_MODE signal). The flip-flop 82 holds a counter value (CT [S:0]), i.e., (S+1) bits that represents the period in which the global ports remain filled and the period in which the local retry mode is set.

The operation of the retry-mode control unit shown in FIG. 6 will be explained. When the retry mode held in the flop-flop 81 is "0," the global retry mode is set. When it is "1," the local retry mode is set. The retry mode held in the flip-flop 81 and the counter value held in the flip-flop 82 are "0" immediately after the power-on reset. Thus, the global retry mode is set. When the requests are set in all global ports, the counter value starts increasing. The counter value is reset if any one of the global port is reset. If the counter value is not reset and reaches a prescribed one, the retry-mode bit is inverted, whereby the mode is switched to the local retry mode. At this time, the counter value is reset.

In the local retry mode, the counter value keeps increasing. When it reaches the prescribed value, the retry-mode bit is inverted. The mode is thereby switched back to the global retry mode. At this time, too, the counter is reset.

To enable the retry-mode control units 13 to determine the state of the snoop process unit 12, two bits (VALID, HOLD) are set in the local port 21 and the global port 51, respectively. These bits indicate the states of the ports 21 and 51. The state variables corresponding to these states are transferred to the retry-mode control units 13. The bits (VALID, HOLD) set in the local port 21 shall be called "LV, LH, and the bits (VALID, HOLD) set in the global port 51 shall be called "GV, GH." LV is the VALID bit of the local port 21 and indicates that a valid request has been set in the local port 21. LH is the HOLD bit of the local port 21 and indicates that the request has been supplied to the local-snoop pipeline 30. GV is the VALID bit of the global port 51 and indicates that a valid request has been set in the global port 51. GH is the HOLD bit of the global port 51 and indicates that the global snoop is being executed.

Of these four bits, LV, GV and GH are identical to those that have been used in the conventional local and global ports. LH is a new type of a bit, which is used to realize the local retry control according to the present invention.

Figure 7:
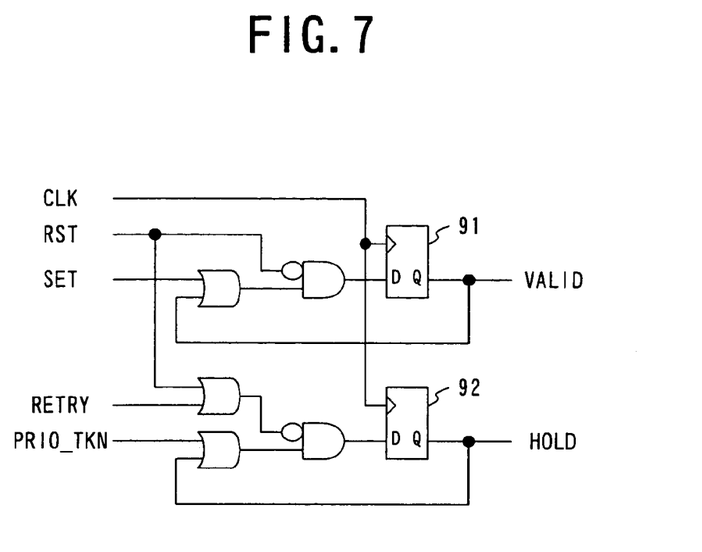
FIG. 7 is a circuit diagram showing an example of the configuration of a state-variable control circuit according to this invention.

The local port 21 and the global port 51 have a state-variable control circuit each. The state-variable control circuit is configured to control the state variables (VALID, HOLD) described above. FIG. 7 is a circuit diagram showing an example of the configuration of the state-variable control circuit according to this invention. The initial state is (VALID, HOLD)=(0, 0). To set the request in the port, a SET signal sets VALID, i.e., the output of a flip-flop 91. When the port receives a PRIO_TKN signal that indicates priority of snoop has been acquired, the HOLD, i.e., the output of a flip-flop 92, is set. When the port receives a RETRY signal that indicates a retry, the HOLD signal is reset. When the port receives a RESET signal because a power-on reset or the like is performed, both VALID and HOLD are reset.

Figure 8:
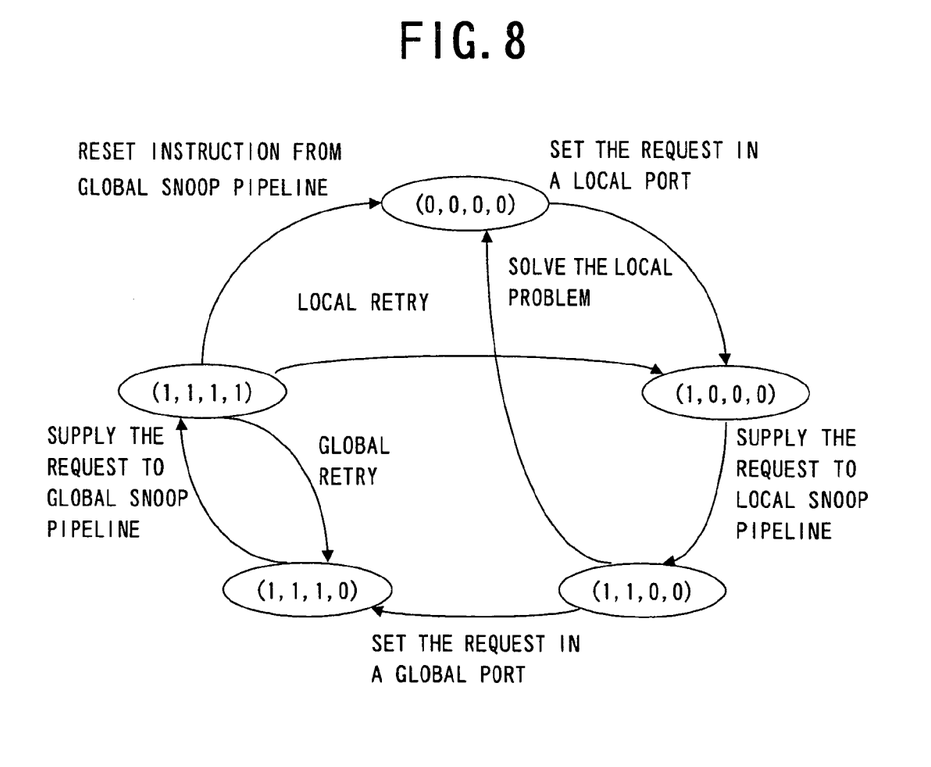
FIG. 8 is a state-transition diagram representing an example of the transition of state variables (LV, LH, GV, GH), according to the present invention.

The transition of the state variables (VL, LH, GV, GH), which takes place every time a request is made, will be explained. FIG. 8 is a state-transition diagram representing an example of the transition of the state variables (LV, LH, GV, GH), according to the present invention. After the power-on reset, these variables are (0, 0, 0, 0). The CPU 3 or the IO 4 issues a request to the SC 5. When the request is set in the local port 21, LV is set, changing the state variables to (1, 0, 0, 0). When the request acquires the priority of the local snoop, LH is set, changing the state variables to (1, 1, 0, 0).

If the local snoop has solved the local problem, LV and LH are reset. In this case, the state variables change to (0, 0, 0, 0). Thus, the process is terminated. On the other hand, if the local snoop has failed to solve the local problem, the request is broadcast and set in the global port 51. In this case, the state variables change to (1, 1, 1, 0) because the GV is set. Thereafter, the request may acquire the priority of the global snoop. Then, GH is set, and the state variables change to (1, 1, 1, 1).

When the global snoop finishes processing the request, the (VALID, HOLD) held in both the local port 21 and the global port 51 are reset. As a result, the state variables change to (0, 0, 0, 0).

If a retry is instructed because the address field is busy in the global snoop, and when in the global retry mode, GH is reset and takes part again in the priority of the global snoop. At this time, the state variables are (1, 1, 1, 0). In the local retry mode, the bits VALID and HOLD of the global port and the HOLD of the local port are reset, and the process is performed again, first at the step preceding the local snoop. At this time, the state variables are (1, 0, 0, 0).

The mechanism of the local snoop is not indispensable in the present invention. The invention can be applied to a system in which the request made by the CPU 3 is directly broadcast. In such a system, each broadcast queue 41, not the local port 21, holds the request. The broadcasting of the request held in any broadcast queue 41 is retried when the global snoop pipeline 60 issues a retry instruction in the local retry mode.

What is claimed is:

1. An apparatus for controlling a multi-processor system, which is designed for use in a scalable multi-processor system having a plurality of nodes and which is provided in each node to perform a process on a data request, said apparatus comprising:
    a plurality of local ports to hold data request made from the node;
    a local snoop unit to perform a local snoop on the requests held in the local ports;
    a broadcast queue to hold the request subjected to the local snoop and broadcasts the request to other nodes when the local snoop fails to process requested data;
    a plurality of global ports to hold requests broadcast from the other nodes;
    a global snoop unit to perform a global snoop on the requests held in the global ports; and
    a plurality of retry-mode control units that have a global retry mode and a local retry mode, and switch from one of the global retry mode and the local retry mode to the other in accordance with a prescribed condition, so that a retry instruction is issued to the global ports in the global retry mode or to the local ports in the local retry mode when the global snoop fails to process the requested data.

2. The apparatus for controlling a multi-processor system, according to claim 1, wherein the local ports keep holding the data request issued from the node, until the local snoop addresses the data request or until the global snoop address the data request.

3. The apparatus for controlling a multi-processor system, according to claim 1, wherein a number of the local ports is the same as a number of requests that can be issued from a CPU or an IO of the node.

4. The apparatus for controlling a multi-processor system, according to claim 1, wherein the retry-mode control units switch to the local snoop mode when all global ports corresponding to one node are used to perform retries for a prescribed period in the global snoop mode.

5. The apparatus for controlling a multi-processor system, according to claim 1, wherein the retry-mode control units switch to the global snoop mode when the local snoop mode remains valid for a prescribed period.

6. The apparatus for controlling a multi-processor system, according to claim 1, wherein a number of the retry-mode control units is the same as a number of the nodes.

7. An apparatus for controlling a multi-processor system, which is designed for use in a scalable multi-processor system having a plurality of nodes and which is provided in each node to perform a process on a data request, said apparatus comprising:
    a broadcast queue to hold a data request issued from the node and broadcast the data request to the other nodes;
    a plurality of global ports to hold data requests issued from the other nodes;
    a global snoop unit to perform a global snoop on the requests held in the global ports; and
    a plurality of retry-mode control units that have a global retry mode and a local retry mode, and switch from one of the global retry mode and the local retry mode to the other in accordance with a prescribed condition, so that a retry instruction is issued to the global ports in the global retry mode or to the broadcast queue in the local retry mode when the global snoop fails to process the requested data.

8. The apparatus for controlling a multi-processor system, according to claim 7, wherein the broadcast queue keeps holding the data request issued from the node, until the local snoop addresses the data request or until the global snoop addresses the data request.

9. A method of controlling a multi-processor system, which is a scalable multi-processor system having a plurality of nodes and which performs a process on a data request in each node, said method comprising:
    holding a data request made from the node in a plurality of local ports;
    performing a local snoop on the requests held in the local ports;
    holding the request subjected to the local snoop;
    broadcasting the request to the other nodes when the local snoop fails to process requested data;
    holding requests broadcast from the other nodes in a plurality of global ports;
    performing a global snoop on the requests held in the global port; and
    switching from one of a global retry mode and a local retry mode to the other of the global retry mode and the local retry mode in accordance with a prescribed condition so that a retry instruction is issued for the global ports in the global retry mode and a retry instruction is issued for the local ports the local retry mode when the global snoop fails to process the requested data.

10. The method of controlling a multi-processor system, according to claim 9, wherein holding the data request in the plurality of local ports holds the data request until the local snoop addresses the data request or until the global snoop addresses the data request.

11. The method of controlling a multi-processor system, according to claim 9, wherein a number of local ports is the same as a number of requests that can be issued from a CPU or an IO that of the node.

12. The method of controlling a multi-processor system, according to claim 9, wherein the switching switches to the local retry mode when all global ports corresponding to one node are used to perform retries for a prescribed period in the global retry mode.

13. The method of controlling a multi-processor system, according to claim 9, wherein the switching switches to the global retry mode when the local retry mode remains valid for a prescribed period.

14. The method of controlling a multi-processor system, according to claim 9, wherein the switching switches between the global retry mode and local retry mode a number of time.

15. A method of controlling a multi-processor system, which is a scalable multi-processor system having a plurality of nodes and which performs a process on a data request in each node, said method comprising:
    holding a data request issued from the node;
    broadcasting the data request to the other nodes;
    holding data requests issued from the other nodes in a plurality of global ports;
    performing a global snoop on the held requests; and
    switching from one of a global retry mode and a local retry mode to the other of the global retry mode and the local retry mode in accordance with a prescribed condition so that a retry instruction is issued for the global ports in the global retry mode and for local ports in the local retry mode when the global snoop fails to process the requested data.

16. The method of controlling a multi-processor system, according to claim 15, wherein the holding the data request from the node holds the data request until a local snoop addresses the data request or until the global snoop addresses the data request.

17. A scalable node comprising:

an apparatus to control a multi-processor system, the apparatus being configured for use in a scalable multi-processor system having a plurality of nodes the apparatus including:
- a plurality of local ports to hold a data request;
- a local snoop unit to perform a local snoop on the requests held in the local ports;
- a broadcast queue to hold the request subjected to the local snoop and broadcast the request to the other nodes when the local snoop fails to process requested data;
- a plurality of global ports to hold requests broadcast from the other nodes;
- a global snoop unit to perform a global snoop on the requests held in the global ports; and
- a plurality of retry-mode control units that have a global retry mode and a local retry mode, and switch from one of the global retry mode and the local retry mode to the other in accordance with a prescribed condition, so that a retry instruction is issued to the global ports in the global retry mode or to the local ports in the local retry mode when the global snoop fails to process the requested data;
- a plurality of CPUs to issue data requests to the apparatus for controlling a multi-processor system; and
- a main memory to hold data, which is read in accordance with a request issued from the apparatus.

18. A scalable multi-processor system comprising:

plurality of scalable nodes, each of the scalable nodes includes an apparatus participating in control of the multi-processor system, the apparatus includes:
- a plurality of local ports to hold a data request made from the node;
- a local snoop unit to perform a local snoop on the requests held in the local ports;
- a broadcast queue to hold the request subjected to the local snoop and broadcast the request to the other nodes when the local snoop fails to process requested data;
- a plurality of global ports to hold requests broadcast from the other nodes;
- a global snoop unit that performs a global snoop on the requests held in the global ports; and
- a plurality of retry-mode control units that have a global retry mode and a local retry mode, and switch from one of the global retry mode and the local retry mode to the other in accordance with a prescribed condition, so that a retry instruction is issued to the global ports in the global retry mode or to the local ports in the local retry mode when the global snoop fails to process the requested data;
- a plurality of CPUs to issue data requests to the apparatus for controlling a multi-processor system; and
- a main memory to hold data, which is read in accordance with a request issued from the apparatus.

* * * * *

UNITED STATES PATENT AND TRADEMARK OFFICE
CERTIFICATE OF CORRECTION

PATENT NO.        : 7,590,686 B2
APPLICATION NO.   : 11/045077
DATED             : September 15, 2009
INVENTOR(S)       : Satoshi Nakagawa It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1107 days.

Signed and Sealed this

Fourteenth Day of December, 2010

David J. Kappos
*Director of the United States Patent and Trademark Office*